US012639410B2

(12) United States Patent
Thiebot et al.

(10) Patent No.: US 12,639,410 B2
(45) Date of Patent: May 26, 2026

(54) METHOD FOR VERIFYING THE AUTHENCITY OF A FINGERPRINT

(71) Applicant: IDEMIA IDENTITY & SECURITY FRANCE, Courbevoie (FR)

(72) Inventors: Alain Thiebot, Courbevoie (FR); Julien Doublet, Courbevoie (FR); Jean Beaudet, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 159 days.

(21) Appl. No.: 18/453,428

(22) Filed: Aug. 22, 2023

(65) Prior Publication Data

US 2024/0070249 A1 Feb. 29, 2024

(30) Foreign Application Priority Data

Aug. 26, 2022 (FR) ...................................... 22 08571

(51) Int. Cl.
G06V 40/13 (2022.01)
G06F 21/32 (2013.01)
G06V 40/12 (2022.01)

(52) U.S. Cl.
CPC .......... G06F 21/32 (2013.01); G06V 40/1347 (2022.01); G06V 40/1365 (2022.01)

(58) Field of Classification Search
None
See application file for complete search history.

(56) References Cited

U.S. PATENT DOCUMENTS 8,588,484 B2 11/2013 Wang et al.
2010/0266168 A1 10/2010 Wang et al.
2013/0265218 A1* 10/2013 Moscarillo .............. G06F 21/83
345/156

(Continued)

FOREIGN PATENT DOCUMENTS

EP 792 819 A1 3/2021

OTHER PUBLICATIONS

French Preliminary Search Report & Written Opinion issued Apr. 14, 2023 in French Application 22 08571 filed on Aug. 26, 2022, 11 pages (with English Translation of Category of Cited Documents).

(Continued)

*Primary Examiner* — Joseph R Haley
(74) *Attorney, Agent, or Firm* — Oblon, McClelland, Maier & Neustadt, L.L.P.

(57) ABSTRACT

A biometric verification method for verifying the authenticity of a fingerprint acquisition of a reference image of a reference fingerprint including acquisition of a candidate image of a candidate fingerprint, geometric comparison between the geometric characteristic of the pattern of said reference print and the geometric characteristic of the pattern of said candidate print extracted from the acquired images, determination of geometric coherence between said reference print and said candidate print as a function of the result of the geometric comparison step and of the reference and candidate digital geometric configuration information extracted from the acquired images, and decision-making as to the authenticity of said candidate fingerprint as a function of the result of the geometric coherence determination step.

13 Claims, 3 Drawing Sheets

(56) References Cited

U.S. PATENT DOCUMENTS

| | | | |
|---|---|---|---|
| 2014/0294261 A1* | 10/2014 | Abe | G06V 40/12 |
| | | | 382/124 |
| 2017/0140193 A1* | 5/2017 | Wang | G06F 16/24578 |
| 2017/0169281 A1* | 6/2017 | Liu | G06V 40/1365 |
| 2021/0056283 A1* | 2/2021 | Yankov | G06F 21/32 |
| 2022/0335750 A1 | 10/2022 | Vibert et al. | |

OTHER PUBLICATIONS

GUPTA, P. et al., "An efficient slap fingerprint segmentation and hand classification algorithm", Neurocomputing, vol. 142, May 20, 2014, pp. 464-477 (14 pages).
Jain, A. et al., "An identity-authentication system using fingerprints", Proceedings of the IEEE, IEEE. New York, US, vol. 85, No. 9, Sep. 1, 1997, pp. 1365-1388 (24 pages).

* cited by examiner

METHOD FOR VERIFYING THE AUTHENCITY OF A FINGERPRINT

The present invention relates to a method for verifying the authenticity of a fingerprint, and a device for verifying the authenticity of a fingerprint. It is applicable in the field of biometric recognition by analysis of the fingerprints of a person.

It is known practice to capture a two-dimensional image of a fingerprint and to compare this image to a set of reference images of an authorized persons database.

Some malicious individuals succeed in reproducing the fingerprint of an authorized person by taking a copy of the print among others on a film. Such an individual can then glue the film onto his or her own finger in order to evade the security.

The document EP3073416 discloses a device for verifying the veracity of a fingerprint which makes it possible to verify that the print which is presented does effectively correspond to the finger which bears it, but this device requires the contactless acquisition of a three-dimensional model of the finger, which requires the installation of a complex and costly device as well as a complex image analysis.

One of the aims of the invention is to remedy at least a part of the abovementioned drawbacks by providing a method for verifying the authenticity of a fingerprint which, in particular, makes it possible to verify that it is not the subject of fraud notably by moulding the print stolen from an authorized third-party on the finger of an unauthorized person. To this end, according to the invention, a biometric verification method is provided which is intended to verify the authenticity of a fingerprint, the verification method comprising:

- a step of acquisition of a reference image, notably two-dimensional, of a reference fingerprint,
- a step of extraction of reference digital geometric configuration information,
- a step of extraction of a geometric characteristic of a pattern of said reference fingerprint from said reference image,
- a step of acquisition of a candidate image, notably two-dimensional, of a candidate fingerprint,
- a step of extraction of candidate digital geometric configuration information,
- a step of extraction of the geometric characteristic of a pattern of said candidate fingerprint from said candidate image,
- a step of geometric comparison between the geometric characteristic of the pattern of said reference print and the geometric characteristic of the pattern of said candidate print, said geometric characteristics of the patterns being of local nature;
- then, a step of determination of geometric coherence between said reference print and said candidate print as a function of the result of the geometric comparison step and of the geometric configuration information, said geometric configuration information being of overall nature;
- a decision-making step concerning the authenticity of said candidate fingerprint as a function of the result of the geometric coherence determination step. The method thus makes it possible to detect a fraudster who might have arranged one or more false print or prints on his or her own fingers without knowing the orientation or the exact position of the print with respect to the finger. Likewise, in the case of multiple-finger acquisition in particular, this method makes it possible to detect if a fraudster is using false fingers bearing false prints without knowing the geometry of the hand that he or she is seeking to spoof, and do so through the use both of the information derived from the comparison between the patterns, and the geometric configuration information such as positions and angles, on the basis of which the compatibility between, in particular, the alignments of the pattern and the geometry of the hand is verified.

Advantageously, the method comprises a step of comparison between the reference geometric configuration information and the candidate geometric configuration information, and the step of determination of geometric coherence between said reference print and said candidate print is a function of the result thereof, which allows a simple assessment by comparison of values, in the context in particular of geometric configuration information assessed individually, whether such information be angular or position, contrary to the resolution or minimization linked to the multiple-finger model or models in which each piece of information is not individually compared one to one.

Advantageously, the geometric characteristic of a pattern comprises a geometric descriptor of a set of minutiae of said pattern, the recourse to a print pattern contrary to a silhouette of fingers makes it possible to have more accurate and robust characteristics, that are less dependent on the mode of acquisition and the choice of a geometric descriptor of a set of minutiae as geometric characteristic of a pattern allows easy storage in the form of a table of points and robustness of the subsequent comparison, these minutiae being numerous for a print, which guarantees, whatever the mode of acquisition, extracting sufficiently therefrom to apply a significant comparison between those of the reference print and those of the candidate print.

Advantageously, the method comprises:
- a step of determination of position of a distal end and/or of a flexing fold of an inter-distal phalangeal articulation of said finger bearing the pattern of the reference print, notably in a canonical reference frame of the reference image;
- a step of determination of position of a distal end and/or of a flexing fold of an inter-distal phalangeal articulation of said finger bearing the pattern of said candidate print, notably in a canonical reference frame of the candidate image, which then makes it possible to simply implement the step of determination of geometric coherence between the reference print and the candidate print notably by means of a position coherence.

Advantageously, the geometric configuration information comprises, respectively:
- an angle representative of an overall digital longitudinal direction in the acquired image, notably the geometric configuration information comprises a direction of an axis of digital revolution representing the axis of said finger bearing said print notably in a canonical reference frame of the acquired image
- and/or
- a position of each of said patterns relative to a specific digital geometry, such as the distal end of said finger bearing said print and/or the flexing fold of an inter-distal phalangeal articulation of said finger bearing said print,
- which then makes it possible, on the basis of a simple, angular and/or dimensional geometric analysis, to locally characterize the print with respect to the finger which bears it and potentially store, with the acquired image, directly upon the acquisition of the image, the overall direction of the finger or to angularly realign the finger on the acquired image so as to position the longitudinal axis of the finger on the reference axis so as to cancel the overall angle on the final acquired image from which the geometric characteristics of the pattern of said print will be extracted.

Advantageously, the method comprises:

a step of calculation of an overall angle of rotation between said reference print and said candidate print;

a step of calculation of a local angle of rotation between said geometric characteristic of the pattern of said reference print and said geometric characteristic of a pattern of said candidate print, these calculations of the geometric configuration information in the form of angle then allow an easy comparison with the local angle of rotation for the verification of geometric coherence, also the choice of the geometric configuration information in the form of angle allows a technically easier calculation contrary to the calculations based on the dimensions since, in the case of a calculation of working angle of the image it requires an iso-scaling which is not required here.

Advantageously, the step of determination of geometric coherence comprises:

a verification of geometric coherence of position during which it is verified that the relative positions between the pattern of the reference print and said distal end and/or said flexing fold of the inter-distal phalangeal articulation of said finger bearing the pattern of the reference print are substantially identical to the relative positions between the pattern of the candidate print and said distal end and/or said flexing fold of the inter-distal phalangeal articulation of said finger bearing the pattern of the candidate print;

and/or a verification of angular geometric coherence during which it is verified that said overall angle of rotation and said local angle of rotation are substantially identical;

which makes it possible to simply implement the step of determination of geometric coherence between the reference print and the candidate print by means of an angular coherence, in addition to or in a variant of the position coherence.

Advantageously, the step of calculation of a local angle of rotation between said pattern of said reference print and said pattern of said candidate print comprises a step of matching of said patterns and of determination of a transformation of alignment between the two patterns, such as affine transformation, translation-scaling-rotation, which also makes it possible to cover the problems linked to dry fingers or to images of poor quality, and to cover the differences of acquisition modes, the fingers or hands being able to be presented in different planes, with varied separations.

Advantageously, said reference image of the reference fingerprint is acquired by photographic or video capture, by means of a device with or without contact, notably during a remote or on-site enrolment or pre-enrolment and said candidate image of the candidate fingerprint is acquired by photographic or video capture, by means of a device with or without contact, notably during a security check, which makes it possible to acquire both two-dimensional and three-dimensional images, including by means of a telephone with respect to the acquisition of the first image and the second image can thus be acquired during an access or identity check.

Advantageously, the method also comprises a multiple-finger modelling step, which makes it possible to verify the overall coherence at the hand level and thus detect frauds committed by a fraudster not reproducing the geometry of the hand that he or she seeks to spoof.

Advantageously, a multiple-finger model comprising geometric configuration information is defined for the candidate image and the reference image in their respective canonical reference frame, which allows resolution or minimization of the constraints expressed in the reference frames of these models.

Advantageously, during the reference image acquisition step:

at least two distinct reference images are acquired, each comprising a reference fingerprint of two different fingers of a same reference hand and/or the reference image comprises at least two reference fingerprints of two different fingers of a same reference hand, and in that, during the candidate image acquisition step:

at least two distinct candidate images are acquired, each comprising a candidate fingerprint of said two similar different fingers of a candidate similar hand and/or the candidate image comprises at least two candidate fingerprints of two different fingers of a same candidate hand, which makes it possible to construct a multiple-finger model and improve the fraud detection by analysing the coherence for several fingers of the hand, the expression "similar fingers" designating the fingers bearing the same name in the candidate hand and the expression "similar hand" referring to the right or left hand so as to compare the same hand, right or left, of a pair of hands.

Advantageously, during the reference image acquisition step, an image is acquired with fingers tight together and another image is acquired with fingers separated, which makes it possible to limit the unknowns upon the construction of the multiple-finger model.

Advantageously, the images acquired of fingerprints comprise at least a surface representation of a distal phalange of the finger to which the print belongs, which makes it possible to be able in particular to assess positions relative to the flexing fold of the inter-distal phalangeal articulation of said finger.

Furthermore, also a subject of the invention is a biometric verification device intended to verify the authenticity of a fingerprint capable of implementing the biometric verification method according to the invention, offering the same advantages as the invention.

Other features and advantages of the invention will emerge on reading the following description of nonlimiting particular implementations of the invention.

Figure 1:
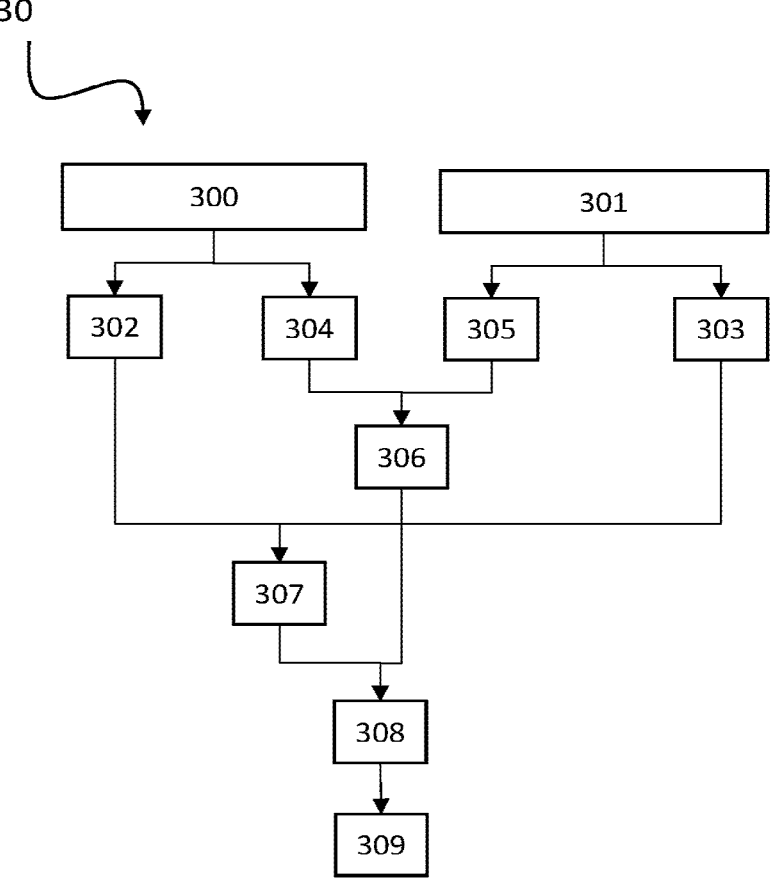
FIG. 1 is a schematic view of the method according to the invention.

FIG. 1 shows an embodiment of the biometric verification method 30 intended to verify the authenticity of a fingerprint. The aim of this method is to verify the compatibility between the alignments of the patterns of prints and the geometry of the finger or of the hand by having recourse on the one hand to a verification of coherence between the patterns and to a coherence of orientation of these patterns with respect to the geometry of the finger or of the hand, notably by taking the orientation into consideration. These verifications thus make it possible to verify the authenticity of a fingerprint and notably identify a fraud which would aim to glue stolen prints in place of the prints of the fraudster without respecting the exact positioning thereof since the orientation of the patterns would not be known to the fraudster having stolen these prints.

Indeed, the detection of fingerprint fraud is improved by the fact that these two scales (local and overall) are taken into consideration, making it possible to verify the compatibility between the alignments of the print patterns and the geometry of the finger or of the hand, with:

the geometric characteristics of the I,R patterns of the prints which are intrinsically local;

that is to say specific to the fingerprint pattern present on the tip of the finger bearing the print considered, for example a detailed geometric pattern of the minutiae, or of the crests; and the digital geometric configuration information $\alpha_{gc}$, $\alpha_{gr}$ which is intrinsically of overall nature; that is to say specific to the geometry of the finger bearing the print, for example position of the pattern of the print relative to the geometry of the finger bearing the print, the angle representative of an overall longitudinal direction of the finger bearing the print.

The method applied to a finger here comprises the following steps:

a step of acquisition 300 of a reference image, notably two-dimensional, of a reference fingerprint, a step of extraction 302 of reference digital geometric configuration information, a step of extraction 304 of a geometric characteristic of a pattern of said reference fingerprint from said reference image, a step of acquisition 301 of a candidate image, notably two-dimensional, of a candidate fingerprint, a step of extraction 303 of candidate digital geometric configuration information, a step of extraction 305 of the geometric characteristic of a pattern of said candidate fingerprint from said candidate image, a step of geometric comparison 306 between the geometric characteristic of the pattern of said reference print and the geometric characteristic of the pattern of said candidate print, a step of comparison 307 between the reference geometric configuration information and the candidate geometric configuration information;

then, a step of determination of geometric coherence 308 between said reference print and said candidate print as a function of the result of the geometric comparison step and of the result of the step of comparison between the geometric configuration information, a decision-making step 309 with respect to the authenticity of said candidate fingerprint as a function of the result of the geometric coherence determination step.

The steps 300, 301 of acquisition of reference and/or candidate image can be performed by direct view capture, for example by means of the rear camera of a cell phone, of MorphoWave™ Compact or by capture done by total reflection on a finger placement surface of glass type for example, as in the MorphoTop™, CBM and MSO systems.

Figure 2:
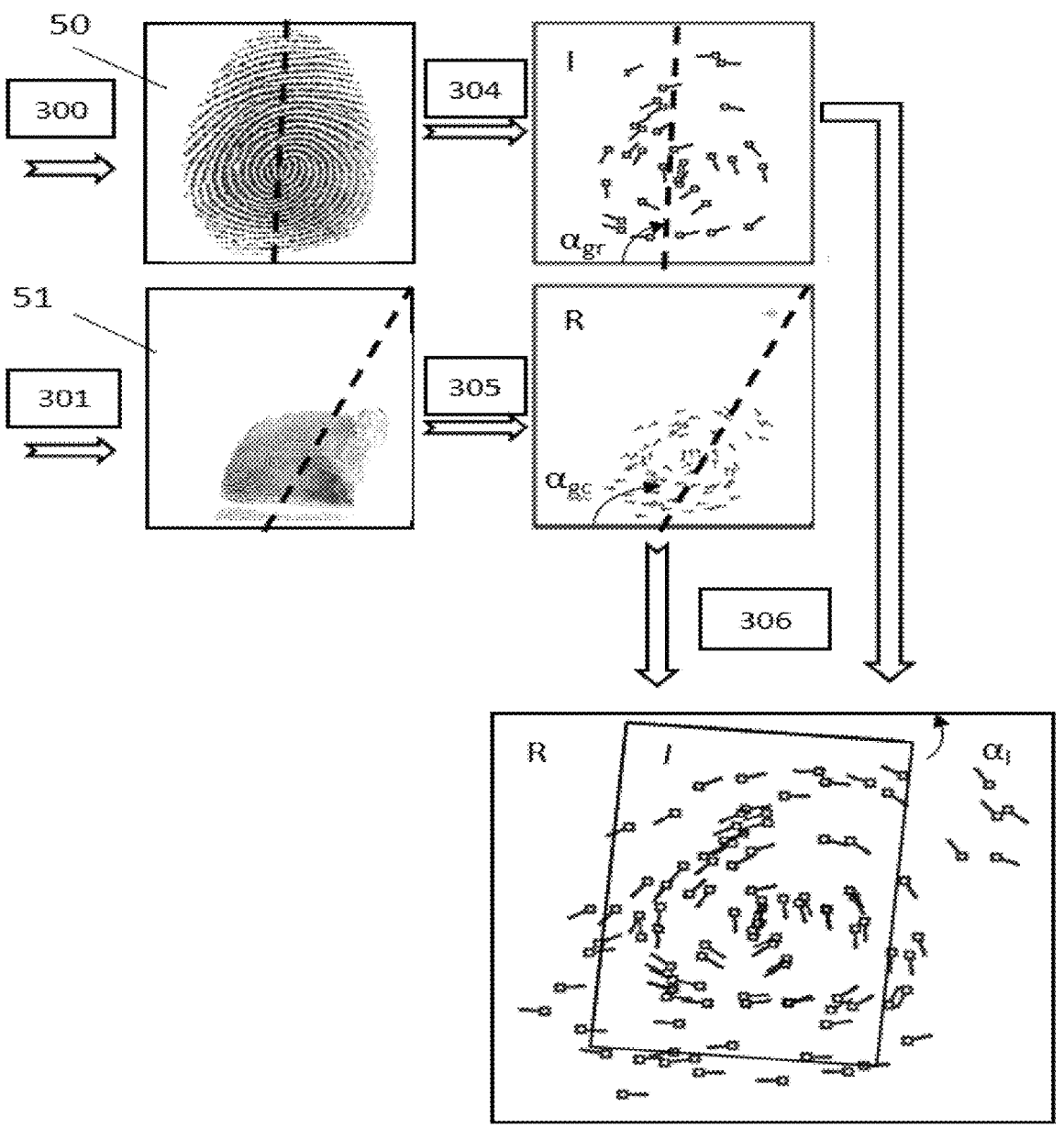
FIG. 2 illustrates a schematic view of a part of the method according to an embodiment of the invention.

FIG. 2 explains more specifically the first steps of the biometric verification method 30 intended to verify the authenticity of a fingerprint 51 according to an embodiment of the invention.

In this figure, for reasons of clarity, the method is applied to the fingerprint of a single finger but several fingers could also appear on the first and/or the second of the images acquired.

More specifically illustrated in this figure are the following steps of the verification method 30:

a step of acquisition 300 of a reference image, of a reference fingerprint 50, said reference image being two-dimensional in the illustration for reasons of clarity but could also be a three-dimensional capture, the acquisition mode being able to be with or without contact, said reference image being that of a reference fingerprint 50, and preferentially here the image contains the view of at least the distal phalange of the finger to which the print belongs, this first acquisition step being notably performed during an enrolment or a pre-enrolment;

a step of extraction 302 of reference digital geometric configuration information, this information is based notably on the form, on the orientation and/or on the dimensions of the acquired part of the finger bearing the reference print 50, that is to say, for example, at least the distal phalange, a step of extraction 304 of a geometric characteristic of a pattern I of said reference fingerprint 50 from said reference image, here the geometric characteristic corresponds to the detailed geometric pattern of the minutiae, but of the crests, as described in the document by Feng, J., Ouyang, Z., & Cai, A. (2006). Fingerprint matching using ridges. Pattern Recognition, 39(11), 2131-2140, could also be extracted instead of the minutiae or in addition, with a view to the subsequent geometric comparison (or "matching"); notably, the order of these two first extraction steps can vary with one another a step of acquisition 301 of a candidate image, said candidate image being two-dimensional in the illustration for reasons of clarity but could also be a three-dimensional capture, the acquisition mode being able to be with or without contact, said reference image being that of a candidate fingerprint 51, and preferentially here the image contains the view of all of the distal phalange of the finger to which the print belongs, this first acquisition step being notably performed in a security or access check, a second step of extraction 303 of candidate digital geometric configuration information, this information is based notably on the form, on the orientation and/or on the dimensions of the acquired part of the finger bearing the candidate print, that is to say, for example, the distal phalange, a second step of extraction 305 of the geometric characteristic of a pattern R of said candidate fingerprint 51 from said second image, here the geometric characteristic therefore corresponds to the detailed geometric pattern of the minutiae since the geometric characteristic used is common to both extractions so as to then be able to be used in the comparison of their results, notably, and the order of these two second extraction steps can vary with one another;

a step of geometric comparison 306 is performed between the geometric characteristic of the pattern I of said reference print 50 and the geometric characteristic of the pattern R of said candidate print 51, it here concerning notably the total or partial matching of the minutiae extracted in the preceding steps, that is to say the minutiae of the pattern I of the reference print 50 and the minutiae of the pattern R of the candidate print 51, by proceeding notably with a determination of a transformation of alignment between these two sets of minutiae, such as an affine transformation, translation-scaling-rotation, the scaling allowing for an iso-scaling notably if the acquisition sensor is not of standardized resolution as in the cell phones, and, during this step of geometric comparison 306 (or "matching") or preferentially at the end thereof, of calculating the local angle of rotation al between said set of minutiae of said reference print 50 and said set of minutiae of said candidate print 51; here, this local angle of rotation al corresponds to the angle of rotation to be applied to the geometric characteristic of a pattern I of said reference fingerprint 50 for the minutiae of the pattern I of the reference print 50 to best match the minutiae of the candidate print 51, but it could also concern the reverse direction and in this case the direction used in the rest of the steps is adapted accordingly so as to compare the angles determined according to the same convention. The comparison made here is totally independent of the digital geometric configuration information and, preferentially, in case of recognition 1:N a part of this step of geometric comparison 306, namely the calculation of the local angle of rotation al, and the rest of the method, is performed only once the corresponding reference print is determined and is therefore applied to this single reference print, that is to say to the single reference print remaining after geometric comparison (or "matching"), which avoids multiplying the calculations and the storage of the results thereof.

A minutiae is a point which is situated on the change of continuity of the papillary lines situated on the surface of the dermis, notably of the finger. The choice as geometric characteristic of a pattern of a geometric descriptor of a set of minutiae of said pattern thus makes it possible to create maps of minutiae that are easy to use.

The step of extraction 302 of the reference digital geometric configuration information and the step of extraction 304 of the geometric characteristic of a pattern I of the reference print can be combined, and likewise for the step of extraction 303 of candidate digital geometric configuration information and the step of extraction 305 of the geometric characteristic of a pattern R of the candidate print. For example, these extraction steps can be conducted by image analysis, so that not only the pattern of the print as such is characterized geometrically, here via the geometric descriptors of the minutiae, but also the geometric configuration information of the finger, such information being based notably on the dimensions of the distal phalange. Indeed, the geometric configuration information of the finger can comprise an orientation, in the plane of the image, with respect to the axes of the image, defining the canonical reference frame of the image, with a digital axis of revolution representing the axis of said finger bearing said pattern and/or the position of the distal end of said finger bearing said print and/or the position of the flexing fold of the inter-distal phalangeal articulation of said finger bearing said print in the same reference frame as the minutiae of said print, which can make it possible to compare the relative positions, even determine a distance between the print and the distal end of said finger bearing said print and/or between the print and the flexing fold of the inter-distal phalangeal articulation of said finger bearing said print, and notably for each finger if several fingers appear on the acquired image, this geometric configuration information therefore making it possible to geometrically characterize the print with respect to the finger which bears it, by means of an angle and/or of a position of the pattern I,R relative to the specific digital geometry.

For example, the positions of the minutiae of a finger are expressed in a local reference frame centred on the barycentre of the distal phalange, and the y axis of which is aligned with the main axis of the finger, the overall angle of the finger by definition is therefore nil in this reference frame, and the distal end and/or the flexing fold or folds are then expressed simply as a coordinate along the y axis and, if there are several fingers, the position and orientation of each of the local reference frames are also stored with respect to the canonical reference frame of the image.

Preferentially, the acquisition, both 300 of the reference print and 301 of the candidate print, covers more than the distal phalange but also includes all or part of the intermediate and/or proximal phalange of the finger, so as to enhance the accuracy of the geometric configuration information, notably if it relies on angular information or on the position of the flexing fold of the inter-distal phalangeal articulation.

This geometric configuration information of the finger is preferentially extracted from images acquired by direct view, with or without contact, for example by means of a Morphowave™ device, such contactless acquisition devices notably making it possible to display the silhouette of the finger and more particularly the distal end of the finger and consequently ultimately make it possible to determine the characteristic dimensions of the finger and notably the geometric position of the print with respect to the distal end of the finger.

In the embodiment presented in FIG. 2, the geometric configuration information of the finger corresponds to the orientation of a digital axis of revolution representing the axis of said finger bearing said pattern in the canonical reference frame of the image, an axis which is represented by dotted lines on each of the images and of the patterns I, R, no translation here being applied between the acquired image and the representation of the extracted patterns, and the overall digital longitudinal direction of said finger bearing the print is deduced therefrom which makes it possible to represent the angles $\alpha_{gr}$ of orientation of the digital axis of revolution of the finger bearing the reference print in the pattern I and $\alpha_{gc}$ of orientation of the digital axis of revolution of the finger bearing the candidate print in the pattern R.

In the case of a three-dimensional image, for example, this direction can be obtained by means of a projection in the plane of the first print of the axis of revolution of the cylinder corresponding to the finger bearing the first print.

As a variant, the overall digital longitudinal direction of said finger bearing the print can be imposed, which is the case when the geometric characteristic of the extracted pattern is directly coded relative to the geometric configuration information since that imposes, by design, a zero angle of the overall digital longitudinal direction of said finger bearing the print in the acquired image. For example, the set of minutiae of the pattern I of said reference print 50 and/or the set of minutiae of the pattern R of said candidate print 51 can be coded relative, respectively, to the overall digital longitudinal direction of said finger bearing the reference print 50 in the first image, or to the overall digital longitudinal direction of said finger bearing the candidate print 51 in the second image, which makes it possible to store the set of minutiae of the pattern I of the reference print 50 and the set of minutiae of the pattern R of the reference print 51 with an angle representative of a zero overall digital longitudinal direction, this formatting of the geometric characteristic of the pattern upon its extraction imposes candidate digital geometric configuration information in the form of an angle representative of a zero overall digital longitudinal direction and thus allows a simplified processing subsequently since the angle or angles representative of an overall digital longitudinal direction respectively of the reference print 50 and/or of the candidate print 51 will be zero.

During the comparison step 307, the comparison is made between the reference geometric configuration information $\alpha_{gr}$ and the candidate geometric configuration information $\alpha_{gc}$, and, here in the case of angular configuration geometric configuration information, it notably involves calculating the overall angle of rotation between said reference print 50 and said candidate print 51, which, here, is determined by subtraction between the angle $\alpha_{gc}$ and the angle $\alpha_{gr}$: $\alpha_{gc}-\alpha_{gr}$, consistently with the convention previously adopted;

then, a step of determination of geometric coherence 308 between said reference print 50 and said candidate print 51 is performed as a function of the result of the geometric comparison step al and of the result of the step of comparison between the geometric configuration information $\alpha_{gc}-\alpha_{gr}$, and it here for example involves subtracting these two quantities from one another and comparing the results in absolute value to an angular threshold of coherence, of the order of 10 degrees;

the step 309 of decision-making as to the authenticity of said candidate fingerprint 51 is then a function of the result of the geometric coherence determination step.

The method illustrated here makes it possible, by an estimation of the direction of each finger, bearing the reference print and the candidate print, representative of the overall form, to calculate the overall angle of rotation of the overall form between the two acquisitions $\alpha_{gc}$, $-\alpha_{gr}$ and calculate the local angle of rotation of the minutiae $\alpha_1$, so as to then compare these angles of rotation.

If the steps of extraction of digital geometric configuration information respectively comprise:

a step of determination of the distal end and/or of the flexing fold of the inter-distal phalangeal articulation of said finger bearing the pattern of the reference print 50 and a step of determination of a distance between the pattern of the reference print and said distal end and/or aid flexing fold of the inter-distal phalangeal articulation of said finger bearing the pattern of the reference print 50, a step of determination of the distal end and/or of the flexing fold of the inter-distal phalangeal articulation of said finger bearing the pattern of said candidate print 51, and a step of determination of a distance between the pattern of the candidate print and said distal end and/or said flexing fold of the inter-distal phalangeal articulation of said finger bearing the pattern of the candidate print 51, then the step of comparison 307 between the reference geometric configuration information and the candidate geometric configuration information will comprise a comparison of the same reference and candidate distances to one another, so as to compare the same distance nature.

Thus, the step of determination of geometric coherence 308 here comprises:

a verification of geometric coherence of position during which it is verified that the distance between the pattern of the reference print and said distal end and/or said flexing fold of the inter-distal phalangeal articulation of said finger bearing the pattern of the reference print is substantially identical to the distance between the pattern of the candidate print and said distal end and/or said flexing fold of the inter-distal phalangeal articulation of said finger bearing the pattern of the candidate print, notably by comparison to a tolerance distance threshold, and "substantially identical" should be understood here to mean a maximum difference of approximately 10% of the width of the reference print, corresponding to the tolerance distance threshold; the same geometric coherence verification reasoning being able to be applied to the relative positions and not to the distances, and/or a verification of angular geometric coherence during which it is verified that said overall angle of rotation and said local angle of rotation ($\alpha_1$) are substantially identical, notably by comparison to a tolerance angular threshold, and "substantially identical" should be understood here to mean a maximum difference of approximately 10 degrees, corresponding to the tolerance angular threshold.

It should be noted that the term approximately means that a tolerance of plus or minus 10% of the quantity is admissible, these values being indicative.

The method has been essentially described hitherto in the context of a biometric authentication (1:1), which consists in verifying that a biometric datum, which can for example be located in the chipcard of a passport, is indeed the same as that of the person holding the passport, but it applies also to the identification (1:N) which consists in retrieving a biometric datum from among those of a large number of persons within a database. In the context of the identification (1:N), the reference prints would then be multiple so as to be able to test all the references of the database, the steps involving the reference prints would be repeated, while those concerning only the candidate prints would not and, preferentially, the steps of comparison 307 between the reference geometric configuration information and the candidate geometric configuration information, and of determination of geometric coherence 308 between said reference print and said candidate print and of decision-making 309 would be applied only after the selection of the best print at the end of the iterative step of geometric comparison 306 between the geometric characteristic of the pattern of said reference print and the geometric characteristic of the pattern of said candidate print which will have made it possible to select the most similar reference print. That is to say that, after identification of the corresponding reference print, identified in the geometric comparison step 306, the method continues with the calculation of the local angle then with the subsequent steps as in the case of biometric authentication (1:1).

During the reference image acquisition step, it is possible to acquire several prints, for example:

at least two distinct reference images are acquired, each comprising a reference fingerprint of two different fingers of a same reference hand and/or the reference image comprises at least two reference fingerprints of two different fingers of a same reference hand, and in that, during the candidate image acquisition step:

at least two distinct candidate images are acquired, each comprising a candidate fingerprint of two different fingers of a same candidate hand and/or the candidate image comprises at least two candidate fingerprints of two different fingers of a same candidate hand.

Figure 3:
FIG. 3 illustrates an acquired image comprising the fingerprints of several fingers of a same hand.

Thus, contrary to FIG. 2 in which a single reference print and a single candidate print are compared so as to verify, for each finger, the alignment between the overall reference and candidate characteristics of the finger and the alignment of the reference and candidate minutiae, FIG. 3 provides an image on which several reference prints are acquired simultaneously and the plotted axes represent the angular configuration geometric configuration information which makes it possible to define the angles of orientation of the digital axis of revolution of each finger bearing the reference print. In the case of the acquisition of candidate prints, the same processing is applied.

Figure 4:
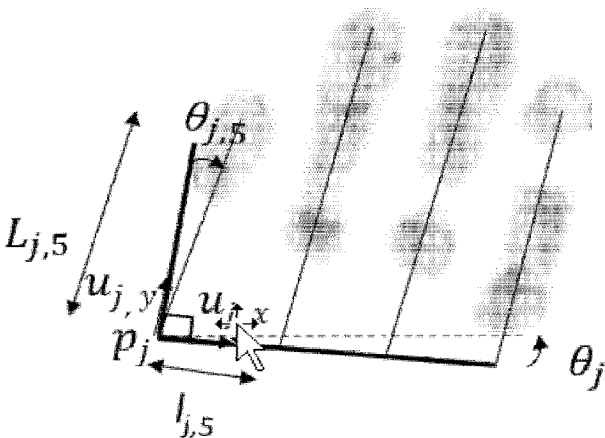
FIG. 4 is an example of model of 4 fingers used in an embodiment of the method according to the invention.

FIG. 4 illustrates an example of a model of four fingers superposed on the reference print 50 of FIG. 3 so as to reveal, in the canonical reference frame of the image j, a vector-based reference frame of the four-finger model. The orthonormal reference frame of the model of four fingers is represented by the vectors $u_x$ and $u_y$ whose axes are represented by thick black lines and among which the axis bearing $u_x$ corresponds to a base line linking the four fingers of the model, preferentially this base line corresponds to a straight line linking the metacarpo-phalangeal articulations, also called first joints. This base line is preferentially set arbitrarily, because the aim is to assess the overall coherence between the reference multiple-finger model and the candidate multiple-finger model, these models also being able to not contain the same number of fingers. As a variant, this line can also be determined by a neural network determining, for example, the position of the first joint in the reference frame of the image of the print.

This model can be used each time several prints, of at least two fingers, are acquired in the same image, whether that relates to the candidate prints or reference prints. The multiple-finger model then constitutes a set of geometric configuration information, which no longer requires the determination as such of the overall angles individually for each finger of each image since it is the overall coherence between the two reference and candidate multiple-finger models which is then examined in the comparison step, without entailing calculating all the parameters of the models. In this embodiment, the determination of overall angles, by definition linked to the overall form of the finger, is then optional but offers the benefit of adding to the robustness of the identification and, for example, in case of images acquired separately 2 fingers by 2 fingers, with one finger in common, for a same hand, that would be used to merge the images together to obtain a single one therefrom with a single multiple-finger model.

In the case of the multiple-finger acquisition as represented in FIGS. 3 and 4, the anti-fraud verification is further reinforced, since the coherence is verified via a multiplicity of geometric configuration information, that is to say not only with a local angle and an overall angle and/or distance but with these same parameters multiplied by the number of fingers in common in the reference and candidate acquisitions; in addition, other geometric parameters such as the inter-finger spacing and/or the length of the fingers are geometric parameters which can be used in the geometric coherence determination step 308.

Thus, in case of acquisition of four fingers as illustrated in FIG. 4, the multiple-finger model (also called partial hand model) of the left hand is here defined in the canonical reference frame of the image j and is expressed by two-dimensional vector relationship for each finger i $x_{j,i} = p_j + R_{\theta_j}(i \cdot l_{j,i} \cdot u_x + L_{j,i} R_{\theta_{j,i}}(u_y))$ in the image j, whether it be reference or candidate, the numeric index i identifies the number of the finger in the multiple-finger model, the arbitrary convention adopted here in FIG. 4 being the digit 1 for the thumb, 2 for the index finger, 3 for the middle finger, 4 for the ring finger and 5 for the little finger;

$R_{\theta_j}$ the angle $\theta_j$ rotation function;

$u_{j,x}$ and $u_{j,y}$ defining the unitary vectors of the orthonormal reference frame of the multiple-finger model with, respectively, $u_{j,x} = R_{\theta_j}(u_x)$ and likewise for $u_{j,y}$, since $u_x$ and $u_y$ are axes of the canonical reference frame, while $u_{j,x}$ and $u_{j,y}$ are axes linked to the model of the image j;

$x_{j,i}$ defining the position vector in two dimensions, abscissa and ordinate, of the points of the finger i in the reference frame of the multiple-finger model of the image; the finger being likened to a straight line segment;

$p_j$ defining the position of a characteristic point of the image of the hand acquired in the canonical reference frame of the image, the origin of which is the point at top left, with the abscissa axis to the right, ordinate axis toward the bottom, the characteristic point of the image of the hand acquired being defined here as the first joint of the little finger (finger referenced 5) bearing the reference print of the little finger, and in a variant, the point p can correspond to the position of the first joint of the index finger (finger referenced 2) bearing the reference print of the index finger;

$\theta_j$ defining the angle of the hand in the image acquired, measured between the base line and the horizontal axis of the canonical reference frame of the image plotted in dotted lines, the base line being plotted in a thick line and being defined as the straight line obtained by regression from the four points representative of the first joints of each finger, which makes it possible to have only a straight line for the hand and not an inter-phalangeal straight segment, without in any way substantially degrading the assessment of the lengths of the fingers;

$\theta_{j,i}$ defining the intra-hand angle between the vector $u_y$ of the reference frame of the multiple-finger model and the axis of the finger i concerned;

$l_{j,i}$ designating here, by choice of convention, the successive inter-finger lengths between the first joint of the finger i and that of the finger i−1;

$L_{j,i}$ designating the length between the first joint and the end of the finger i. $p_j$ and $\theta_j$ condition the axes of the orthonormal reference frame of the multiple-finger model linked to the position of the hand in the image acquired.

In the case of an image acquired, as in FIG. 4, with contact, the silhouette of the finger is not available because the pressure on the finger will not necessarily be sufficient to render visible on the image the distal limit of the finger. The distal end of the finger is defined preferentially as being the centroid of the flesh at the end of the distal phalange of the finger, which notably avoids the risks of the length of the nails being taken into account. Nevertheless, based on the mode of acquisition of the image, the distal end of the finger could be defined differently. For example, if the acquisitions 300, 301 are made solely by contactless optical system, via an optical sensor of the cell phone for example, the silhouette of the finger is visible, so that the distal end of the finger can be defined as being the most distant point of the finger belonging to the distal limit of the finger. Preferentially, during the reference image acquisition step 300, an image is acquired with fingers tight together and another image is acquired with fingers separated, because this dual acquisition makes it possible to easily resolve the system of equations of the four-finger model which then here comprises 19 unknowns of which 14 are linked to the placement, that is to say 7 parameters for each of the two images that are:

> 4 angles $\theta_{j,i}$ (one for each finger of the four-finger model here represented),
> 1 angle of the hand $\theta_j$,
> the 2 coordinates (abscissa and ordinate) of the point $p_j$
> and of which 5 are intrinsic to the geometry of the hand and which are the 4 $L_{j,i}$ of length of each finger as well as the total width of the hand, that is to say, here, the sum of the three inter-finger lengths $l_{j,i}$.

Indeed, the dual acquisition here makes it possible to determine 20 constraints that are:

> 16 positions: for each of the four fingers their coordinates in each of the two views: 2*4*2
> 4 local angles of rotation: one for each corresponding finger between the two images bearing in mind that an equation is obtained concerning the difference of angle between these two fingers by expressing the prints in the reference frame of the image.

Similarly, the constraint of equality is obtained with, here, j=1 for a reference image and j=2 for a candidate image: $\alpha_{li}=(\theta_{2,i}+\theta_2)-(\theta_{1,i}+\theta_1)$, which could also be expressed as being the difference between the angle $\alpha_{gc}$ representative of an overall digital longitudinal direction in the candidate image j=2 and the angle $\alpha_{gr}$ representative of a reference overall digital longitudinal direction j=1 since, by definition, it is the match between the overall angle of rotation between said reference print 50 and said candidate print 51 which is determined here by subtraction between the angle $\alpha_{gc}$ and the angle $\alpha_{gr}$: $\alpha_{gc}-\alpha_{gr}$ which should correspond to the local angle of rotation $\alpha_1$, that is to say of alignment of the minutiae as illustrated in FIG. 2.

The exact resolution is not necessarily sought, but rather minimization, notably if there are less than four fingers in the model, because the resolution will then not be possible, so it will then be a matter of realizing the minimization and of verifying the remainder, that is to say applying the model with its constraints $x_i$=f(parameters) and checking if the model can be in agreement with the observations by having $\|x_i-f(parameters)\|^2<\varepsilon$, with $\varepsilon$ very low, of the order of 10% of the square of the average width of the finger. Rather than exactly resolving, with a view to minimization, all the images acquired, both reference and candidate, can be superposed so as to over-constrain the system and thus for each image added with a 4-finger model: 7 unknowns and 12 (4*2 positions+4 geometric configuration information angles $\alpha_{gi}$) additional equations are added.

The use of other additional or variant constraints is also possible, such as the constraint of increasing angles, that is to say that $$\theta_{i+1}^j - \theta_i^j \geq 0 \text{ or } \theta_{i+1}^j - \theta_i^j \geq \alpha$$

with $\alpha$ weakly negative, which means that the fingers can be fanned out but do not cross.

Furthermore, the overall orientation of each finger can also be an additional constraint because, geometrically, if there is the overall angle of a finger $\gamma_i$, then $\theta+\theta_i=\gamma_i$ in the canonical reference frame of the image, which makes it possible to detect an incoherence between local angle and overall angle or be used in the case where all the fingers have not been able to be matched.

The resolution of the system of equations, or the minimization of the quadratic error, thus makes it possible to determine the geometric coherence 308 between the different reference prints and the different candidate prints, that requiring at least two images j, one reference and one candidate. Indeed, in case of minimization, it is not here a matter of determining all the unknowns of the multiple-finger model but only determining if at least one solution exists once the multiple constraints have been applied to the thus over-constrained model.

Similarly, another constraint concerning the lengths of the fingers in the multiple-finger model can be added, such as relationships between the lengths Li, of the little finger smaller than ring finger type for example, or even by addition from among the terms to be minimized of a second term f(L1,L2,L3,L4) consisting of a function learned, for example by means of a support vector machine (SVM), this additional constraint making it possible to discriminate if said length is possible or not, likewise for the length li between successive fingers or the sum 1 thereof.

Indeed, a multiple-finger model of three fingers or more can also be reconstituted on the basis of several images acquired, each image containing at least two fingers with one common to another image acquired, this reconstitution being performed by merging of the images acquired with iso-scaling according to a method known to a person skilled in the art, this reconstitution with acquisition of several images preferentially taking place in the step of acquisition respectively of reference 300 and/or candidate 301 images.

The biometric verification device intended to verify the authenticity of a fingerprint 51 capable of implementing the biometric verification method according to the invention can comprise several sets of units distinguished notably between units dedicated to the steps relating exclusively to the processing of the images or reference data and units dedicated to the steps of processing of the images or data, candidate or even reference, that is to say not dedicated to the steps exclusively involving the reference images or data. Out of these two sets of entities each or a part of the units of the set comprises optical systems for acquiring images, respectively reference or candidate. This device comprises at least one processor capable of executing the extraction steps 302, 304, preferentially at least one processor is hosted in each set of units and respectively executes the step of extraction 304, 306 of geometric characteristic which is specific to it and the step of extraction 302, 303 of configuration information which is specific to it.

The processors of the sets of entities are linked to a secure common memory space, these memories and linking communication channels belong to the device and can be physical and, for example, a link by means of a bus to a random-access memory, a read-only memory and/or a non-volatile memory; in a variant or in addition, said processor and/or memory space can be hosted in a third-party server or in a virtualized infrastructure (or cloud) and the communication channel for example comprises an antenna and a wireless network connected to one another, for example wide-area networks, Wi-Fi networks or cell phone networks.

The memory space notably hosts the reference geometric characteristics and the reference configuration information.

At least one processor of the set of units dedicated to the steps of processing of the candidate or even reference images or data executes the step of comparison 307 between the reference geometric configuration information and the candidate geometric configuration information, as well as the step of determination of geometric coherence 308 between said reference print and said candidate print as a function of the result of the geometric comparison step and of the result of the step of comparison between the geometric configuration information, and preferentially this same processor executes the decision-making step 309 concerning the authenticity of said candidate fingerprint 51 as a function of the result of the geometric coherence determination step.

The biometric verification method according to the invention is therefore implemented by computer.

The invention claimed is:

1. A biometric verification method for verifying authenticity of a fingerprint, the verification method comprising:
   acquiring a reference image of a reference fingerprint;
   extracting reference digital geometric configuration information;
   extracting a geometric characteristic of a pattern of said reference fingerprint from said reference image;
   acquiring a candidate image of a candidate fingerprint;
   extracting candidate digital geometric configuration information;
   extracting the geometric characteristic of a pattern of said candidate fingerprint from said candidate image;
   comparing between the geometric characteristic of the pattern of said reference print and the geometric characteristic of the pattern of said candidate print, said geometric characteristics of the patterns being of local nature;
   then, determining angular geometric coherence between said reference print and said candidate print based on a result of the comparing and on the geometric configuration information, said geometric configuration information being of overall nature;
   determining authenticity of said candidate fingerprint based on a result of the determined angular geometric coherence;
   calculating an overall angle of rotation between said reference print and said candidate print; and
   calculating a local angle of rotation between said geometric characteristic of the pattern of said reference print and said geometric characteristic of a pattern of said candidate print.

2. The biometric verification method according to claim 1, further comprising comparing between the reference geometric configuration information and the candidate geometric configuration information, wherein the determination of geometric coherence between said reference print and said candidate print is a function of a result thereof.

3. The biometric verification method according to claim 1, wherein the geometric characteristic of a pattern comprises a geometric descriptor of a set of particularities of said pattern.

4. The biometric verification method according to claim 1, further comprising:
   determining a position of a distal end and/or of a flexing fold of an inter-distal phalangeal articulation of said finger bearing the pattern of the reference print, in a canonical reference frame of the reference image; and
   determining a position of a distal end and/or of a flexing fold of an inter-distal phalangeal articulation of said finger bearing the pattern of said candidate print, in a canonical reference frame of the candidate image.

5. The biometric verification method according to claim 1, wherein the geometric configuration information comprises, respectively:
   an angle representative of an overall digital longitudinal direction in the acquired image, the geometric configuration information comprises a direction of an axis of digital revolution representing the axis of said finger bearing a print in a canonical reference frame of the acquired image,
   and/or
   a position of each of said patterns relative to a specific digital geometry, including a distal end of said finger bearing said print and/or flexing fold of an inter-distal phalangeal articulation of said finger bearing said print.

6. The biometric verification method according to claim 5, wherein the determining the geometric coherence further comprises:
   verifying geometric coherence of a position during which it is verified that relative positions between a reference pattern of the reference print and said distal end and/or said flexing fold of the inter-distal phalangeal articulation of said finger bearing the reference pattern of the reference print are substantially identical to relative positions between a candidate pattern of a candidate print and a distal end and/or a flexing fold of the inter-distal phalangeal articulation of said finger bearing the candidate pattern of the candidate print;
   and/or
   verifying angular geometric coherence during which it is verified that an overall angle of rotation and said local angle of rotation are substantially identical.

7. The biometric verification method according to claim 1, wherein the calculating of the local angle of rotation between said pattern of said reference print and said pattern of said candidate print further comprises matching of said patterns and of determination of a transformation of alignment between the two patterns.

8. The biometric verification method according to claim 1, wherein said reference image of the reference fingerprint is acquired by photographic or video capture, by a device with or without contact, during a remote or on-site enrolment or pre-enrolment and said candidate image of the candidate fingerprint is acquired by photographic or video capture, by a device with or without contact, during a security check.

9. The biometric verification method according to claim 1, further comprising multiple-finger modelling.

10. The biometric verification method according to claim 1, wherein, during the acquiring the reference image:
   acquiring at least two distinct reference images, each comprising a reference fingerprint of two different fingers of a same reference hand,
   and/or
   the reference image comprises at least two reference fingerprints of two different fingers of a same reference hand, and
   wherein, during the candidate image acquiring:
   acquiring at least two distinct candidate images, each comprising a candidate fingerprint of said two different fingers of a candidate similar hand,
   and/or
   the candidate image comprises at least two candidate fingerprints of two different fingers of a same candidate hand.

11. The biometric verification method according to claim 10, wherein, during the reference image acquiring, an image is acquired with fingers tight together and another image is acquired with fingers separated.

12. A biometric verification device for verifying authenticity of a fingerprint comprising:

processing circuitry configured to acquire a reference image of a reference fingerprint;

extract reference digital geometric configuration information;

extract a geometric characteristic of a pattern of said reference fingerprint from said reference image;

acquire a candidate image of a candidate fingerprint;

extract candidate digital geometric configuration information;

extract the geometric characteristic of a pattern of said candidate fingerprint from said candidate image;

compare between the geometric characteristic of the pattern of said reference print and the geometric characteristic of the pattern of said candidate print, said geometric characteristics of the patterns being of local nature;

then, determine angular geometric coherence between said reference print and said candidate print based on a result of the comparison and on the geometric configuration information, said geometric configuration information being of overall nature;

determine authenticity of said candidate fingerprint based on a result of the determined angular geometric coherence;

calculate an overall angle of rotation between said reference print and said candidate print; and calculate a local angle of rotation between said geometric characteristic of the pattern of said reference print and said geometric characteristic of a pattern of said candidate print.

13. A non-transitory computer readable medium having stored thereon a computer program that when executed by processing circuitry of a computer causes the processing circuitry to be configured to implement a biometric verification method for verifying authenticity of a fingerprint, the verification method comprising:

acquiring a reference image of a reference fingerprint;

extracting reference digital geometric configuration information;

extracting a geometric characteristic of a pattern of said reference fingerprint from said reference image;

acquiring a candidate image of a candidate fingerprint;

extracting candidate digital geometric configuration information;

extracting the geometric characteristic of a pattern of said candidate fingerprint from said candidate image;

comparing between the geometric characteristic of the pattern of said reference print and the geometric characteristic of the pattern of said candidate print, said geometric characteristics of the patterns being of local nature;

then, determining angular geometric coherence between said reference print and said candidate print based on a result of the comparing and on the geometric configuration information, said geometric configuration information being of overall nature;

determining authenticity of said candidate fingerprint based on a result of the determined angular geometric coherence;

calculating an overall angle of rotation between said reference print and said candidate print; and calculating a local angle of rotation between said geometric characteristic of the pattern of said reference print and said geometric characteristic of a pattern of said candidate print.

\* \* \* \* \*